US010013880B2

(12) United States Patent
Scofield

(10) Patent No.: US 10,013,880 B2
(45) **Date of Patent: *Jul. 3, 2018**

(54) PARKING OCCUPANCY ESTIMATION

(71) Applicant: INRIX, Inc., Kirkland, WA (US)

(72) Inventor: Christopher L. Scofield, Seattle, WA (US)

(73) Assignee: INRIX INC., Kirkland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/613,576

(22) Filed: Jun. 5, 2017

(65) Prior Publication Data

US 2017/0270793 A1 Sep. 21, 2017

Related U.S. Application Data

(63) Continuation of application No. 14/733,018, filed on Jun. 8, 2015, now Pat. No. 9,672,741.

(51) Int. Cl.

| | |
|---|---|
| ***B60Q 1/48*** | (2006.01) |
| ***G08G 1/14*** | (2006.01) |
| ***G07B 15/02*** | (2011.01) |
| ***G08G 1/01*** | (2006.01) |
| ***G04B 15/02*** | (2006.01) |

(52) U.S. Cl.

CPC ............. *G08G 1/141* (2013.01); *G04B 15/02* (2013.01); *G07B 15/02* (2013.01); *G08G 1/012* (2013.01);

(Continued)

(58) Field of Classification Search

CPC ................................. G08G 1/14; G08G 1/065

(Continued)

(56) References Cited

U.S. PATENT DOCUMENTS 4,228,519 A * 10/1980 Pfeifer ................... G07B 15/02 194/215
5,910,782 A * 6/1999 Schmitt .................... G08G 1/14 340/539.1

(Continued)

FOREIGN PATENT DOCUMENTS

| | | | |
|---|---|---|---|
| EP | 2105904 | A1 | 9/2009 |
| EP | 2988284 | A1 | 2/2016 |
| WO | 2014/170506 | A1 | 10/2014 |

OTHER PUBLICATIONS

Int. Search Report/Written Opinion cited in PCT Application No. PCT/US2016/036361 dated Sep. 1, 2016, 17 pgs.

*Primary Examiner* — Phung Nguyen

(74) *Attorney, Agent, or Firm* — Cooper Legal Group, LLC

(57) ABSTRACT

One or more techniques and/or systems are provided for estimating parking occupancy. For a paid parking period, parking meter transaction data may be acquired for a parking meter encompassed by a zone of one or more parking spaces. The parking meter transaction data may be evaluated to determine status data, such as an estimation of whether one or more parking spaces are available, occupied, and/or will become available. A parking occupancy, indicative of a likelihood of available parking spaces, may be estimated based upon the status data. For a free parking period, the parking occupancy may be estimated based upon vehicle flow data that is indicative of vehicles entering, parking, and/or leaving the one or more parking spaces. In this way, the parking occupancy may be provided to a driver to mitigate wasted time and/or gas otherwise spent searching for an available parking space.

20 Claims, 9 Drawing Sheets

(52) U.S. Cl.
CPC ......... *G08G 1/0112* (2013.01); *G08G 1/0116* (2013.01); *G08G 1/0129* (2013.01); *G08G 1/0141* (2013.01); *G08G 1/143* (2013.01); *G08G 1/144* (2013.01); *G08G 1/147* (2013.01)

(58) Field of Classification Search
USPC ........................... 340/932.2, 988; 705/13, 28
See application file for complete search history.

(56) References Cited

U.S. PATENT DOCUMENTS 7,026,954 B2 * 4/2006 Slemmer .................. G08G 1/14 340/932.2
9,087,453 B2 * 7/2015 Krivacic ................ G06Q 10/02
2005/0280555 A1 * 12/2005 Warner, IV .............. G08G 1/14 340/932.2
2007/0050240 A1 * 3/2007 Belani ................ G06Q 30/0284 705/13
2008/0048885 A1 * 2/2008 Quinn .................... G08G 1/143 340/932.2
2010/0052946 A1 * 3/2010 Levine ................... G08G 1/143 340/932.2
2012/0095790 A1 * 4/2012 Stefik ..................... G06Q 10/02 705/5
2013/0141252 A1 6/2013 Ricci
2013/0265174 A1 10/2013 Scofield et al.
2014/0350853 A1 11/2014 Proux
2016/0019779 A1 1/2016 Tobolski et al.

* cited by examiner

PARKING OCCUPANCY ESTIMATION

RELATED APPLICATION

This application claims priority to and is a continuation of U.S. Pat. No. 9,672,741, filed on Jun. 8, 2015 and issued on Jun. 6, 2017, entitled "PARKING OCCUPANCY ESTIMATION", which is incorporated herein.

BACKGROUND

Many drivers may utilize public or private parking spots when traveling to a destination. In an example, a driver may use on-street parking when traveling to a trendy new urban restaurant in a city. In another example, the driver may park in a parking lot or parking deck for work. During the day, such as from 8:00 am until 6:00 pm, the user may pay for parking. During the evening, such as from 6:00 pm until 8:00 am, parking may be free. The driver may waste significant time and fuel, which may increase pollution, while attempting to locate available parking spaces.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for estimating parking occupancy are provided herein. In an example of estimating parking occupancy such as for paid periods during the day, a zone encompassing a parking meter may be defined. Parking meter transaction data, for the parking meter, may be acquired (e.g., a parking meter identifier, a timestamp of a time with which the parking meter was paid, a paid parking duration for which parking was paid, etc.). The parking meter transaction data may be evaluated to determine status data for one or more parking spaces managed by the parking meter. For example, the status data may be calculated, from the parking meter transaction data, as an estimation as to whether one or more parking spaces may be available or occupied and/or an estimated availability time at which one or more occupied parking spaces are estimated to become available. A parking occupancy (e.g., a low occupancy indicating a high likelihood that parking spaces are available, a medium occupancy indicating a moderate likelihood that parking spaces are available, or a high occupancy indicating a low likelihood that parking spaces are available) may be estimated based upon the status data. The parking occupancy may be displayed through a user interface.

In an example of estimating parking occupancy such as for free periods during the night, vehicle flow data (e.g., a location of a vehicle, a speed of the vehicle, a heading of the vehicle, and/or other information such as global positioning system (GPS) data provided by the vehicle), associated with one or more vehicles, may be acquired. The vehicle flow data may be evaluated to determine a start trip count of vehicles that started trips from the zone. The zone may be defined to encompass a parking meter and/or one or more parking spaces. The zone may overlap with other zones. The zone may be defined accordingly any shape and/or size (e.g., about a 50 to about a 70 meter zone or any other size around the parking meter). The vehicle flow data may be evaluated to determine an end trip count of vehicles that ended trips in the zone. A net number of vehicles within the zone at a point of time may be determined based upon a difference between the end trip count and the start trip count. The net number of vehicles may be integrated over time to determine a net number of vehicles observed to be remaining in the zone (e.g., parking) compared to leaving the zone. The parking occupancy for the zone may be determined based upon the net number of vehicles observed to be remaining in the zone compared to leaving the zone. In an example, both vehicle flow data and parking meter transaction data may be used to determine the parking occupancy for the zone. For example, the parking meter transaction data may be matched to the vehicle flow data, such as the net number of vehicles observed to be remaining in the zone compared to leaving the zone (e.g., the integration of the net number of vehicles), during a transition between a paid-period and a free period (e.g., 6:00 pm) to obtain a scale factor and offset. The scale factor and offset may be used to correctly scale and/or offset the net number of vehicles observed to be remaining in the zone compared to leaving the zone for the free-period.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
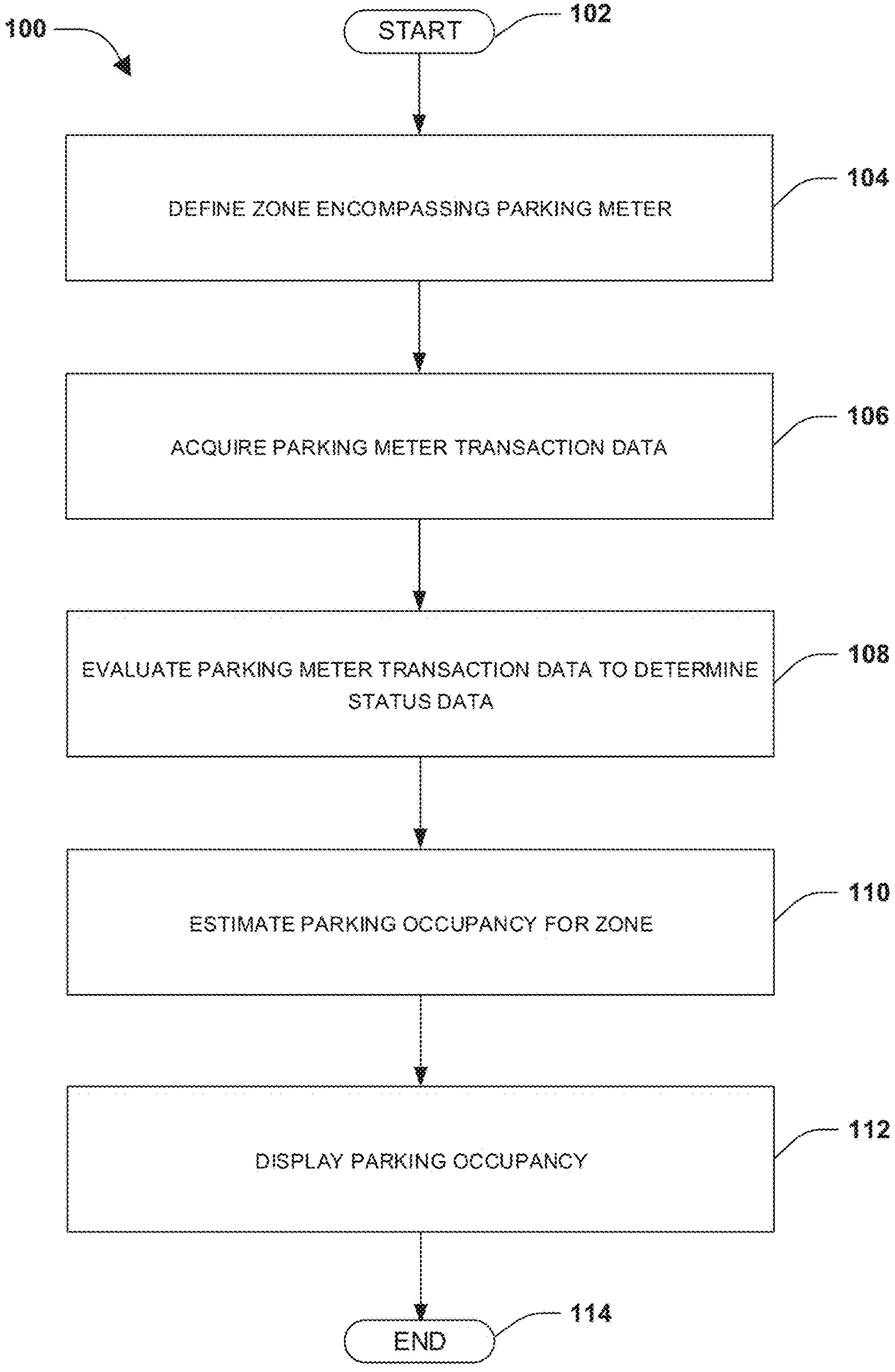
FIG. 1 is a flow diagram illustrating an exemplary method of estimating parking occupancy using parking meter transaction data.

The claimed subject matter is now described with reference to the drawings, wherein like reference numerals are generally used to refer to like elements throughout. In the following description, for purposes of explanation, numerous specific details are set forth to provide an understanding of the claimed subject matter. It may be evident, however, that the claimed subject matter may be practiced without these specific details. In other instances, structures and devices are illustrated in block diagram form in order to facilitate describing the claimed subject matter.

One or more systems and/or techniques for estimating parking occupancy are provided herein. Parking meter transaction data, indicative of when and for how long drivers pay for parking at one or more parking spaces, and/or vehicle flow data, indicative of vehicles remaining/parking within the one or more parking spaces, may be evaluated to determine parking occupancy for the one or more parking spaces. The parking occupancy may be displayed through a user interface, such as a smart phone app, a website, a vehicle head-end or navigation unit, a wearable device, or any other device, so that a driver may quickly identify a likelihood that an available parking space is available or not at a location such as street-side parking. In this way, the user may reduce time, fuel consumption, and/or pollution otherwise wasted in searching for an available parking space.

An embodiment of estimating parking occupancy is illustrated by an exemplary method 100 of FIG. 1. At 102, the method 100 starts. At 104, a zone may be defined to encompass a parking meter that may service one or more parking spaces. It may be appreciated that the zone may be defined as any shape or size (e.g., about a 50 to about a 70 meter zone or any other size around the parking meter, which may or may not overlap with other zones defined for other parking meters). At 106, parking meter transaction data for the parking meter may be acquired. The parking meter transaction data may comprise a parking meter identifier, a timestamp associated with when the parking meter was paid, and a paid parking duration for which parking was paid. In an example, the parking meter transaction data may be received in real-time, such as around a time when or in response to receiving a driver request for parking occupancy information for a location near the parking meter.

At 108, the parking meter transaction data may be evaluated to determine status data for the one or more parking spaces. In an example, the status data may comprise an estimation as to whether one or more parking spaces are available or occupied, such as based upon the timestamp of when the parking meter was paid and the paid parking duration. In an example, the status data may comprise an estimated availability time at which one or more occupied parking spaces are estimated to become available, such as based upon the timestamp of when the parking meter was paid and the paid parking duration (e.g., the parking meter may manage multiple parking spaces, and thus parking meter transactions, specified by the parking meter transaction data, may be tracked over time to estimate how many parking spaces are likely to be occupied).

At 110, a parking occupancy for the zone may be estimated based upon the status data (e.g., a likelihood that a parking space is available; an estimated number of available parking spaces; and/or other information indicative of parking availability). In another example of determining the parking occupancy, parking occupancies may be estimated for one or more time periods (e.g., every 30 minutes or any other time period) based upon total paid parking durations for respective time periods. For example, a total paid parking duration for a first time period (e.g., 25 minutes of paid parking out of a 30 minute time window) may be determined. A first parking occupancy for the first time period may be estimated based upon the total paid parking duration (e.g., a relatively high parking occupancy, indicating a relatively low likelihood of an available parking space, may be determined). At 112, the parking occupancy may be displayed through a user interface. For example, the parking occupancy may be displayed as a textual notification (e.g., a likelihood of available parking spaces) or a visual notification (e.g., a parking space user interface element, representing a parking space within a map, may be color coded based upon the likelihood of available parking spaces). The parking occupancy may be displayed through a mobile device, a wearable device, a vehicle head-end or navigation unit, a website, an app, etc. In an example, the parking meter transaction data may be evaluated to determine a payment rate for the parking meter. The payment rate may be displayed through the user interface.

In an example, a set of parking occupancies may be estimated for one or more zones encompassing portions of a block of parking spaces (e.g., a city block comprising 25 parking spaces). A block parking occupancy for the block of parking spaces may be determined based upon the set of parking occupancies. The block parking occupancy may be displayed through the user interface (e.g., a block user interface element, representing the block, may be colored according to a likelihood that parking spaces within the block are available). Responsive to the block parking occupancy corresponding to a high occupancy threshold range (e.g., where little to no parking spaces are estimated to be available), a high occupancy status may be displayed for the block user interface element representing the block through the user interface. Responsive to the block parking occupancy corresponding to a medium occupancy threshold range (e.g., where a few parking spaces are estimated to be available), a medium occupancy status may be displayed for the block user interface element. Responsive to the block parking occupancy corresponding to a low occupancy threshold range (e.g., where numerous parking spaces are estimated to be available), a low occupancy status may be displayed for the block user interface element. Responsive to the block parking occupancy being indicative of a parking obstruction (e.g., construction may have restricted parking for the block), a parking obstruction status may be displayed for the block user interface element. Responsive to the block parking occupancy being indicative of a restriction (e.g., police may have shut off access to parking due to a parade), a restriction status may be displayed for the block user interface element.

In an example, a parking occupancy model may be generated based upon the parking occupancy. For example, the parking occupancy model may be trained based upon parking occupancies associated with various weather conditions, seasons, occurrences of events (e.g., a sporting event), and/or other variables. In this way, future parking occupancies and/or historic parking occupancies, having such conditions/variables, may be predicted for the zone using the parking occupancy model.

In an example, the parking occupancy may be updated based upon vehicle flow data, such as global positioning system (GPS) data provided by a vehicle (e.g., a location of the vehicle, a speed of the vehicle, a heading of the vehicle, etc.). For example, vehicle flow data, associated with one or more vehicles, may be acquired (e.g., through cellular or other communication mediums). The vehicle flow data may be evaluated to determine a start trip count of vehicles that started trips from the zone and an end trip count of vehicles that ended trips in the zone. A net number of vehicles within the zone at a point of time may be determined based upon a difference between the end trip count and the start trip count. The net number of vehicles may be integrated over time to determine a net number of vehicles observed to be remaining in the zone (e.g., parking) compared to leaving the zone. The parking occupancy for the zone may be updated based upon the net number of vehicles observed to be remaining in the zone compared to leaving the zone to create an updated parking occupancy for the zone. In an example, the net number of vehicles observed to be remaining in the zone compared to leaving the zone may be normalized based upon the parking meter transaction data. In an example, the parking meter transaction data may be matched to the net number of vehicles observed to be remaining in the zone compared to leaving the zone), during a transition between a paid-period and a free period (e.g., 6:00 pm), to obtain a scale factor and offset. The scale factor and offset may be applied to the net number of vehicles observed to be remaining in the zone compared to leaving the zone.

In an example, the parking occupancy and/or the updated parking occupancy may be adjusted based upon a business type of a business within a threshold distance of the zone. For example, parking spaces near dinner restaurants may have high occupancy at night compared to morning. In another example, parking spaces near a hospital may have varying parking occupancies. In this way, parking occupancy may be estimated and provided to drivers. At 114, the method 100 ends.

Figure 2A:
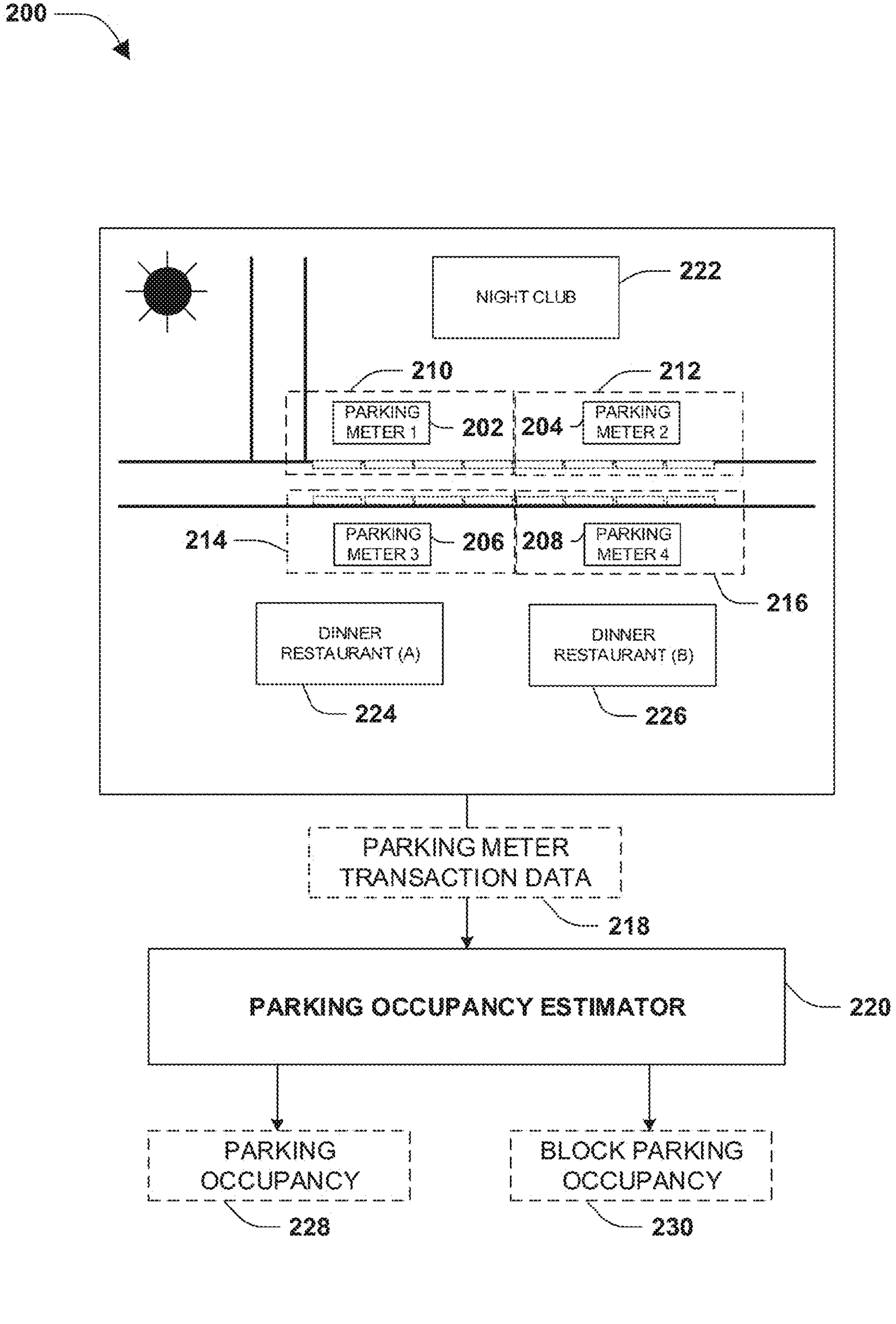
FIG. 2A is a component block diagram illustrating an exemplary system for estimating parking occupancy using parking meter transaction data.
Figure 2B:
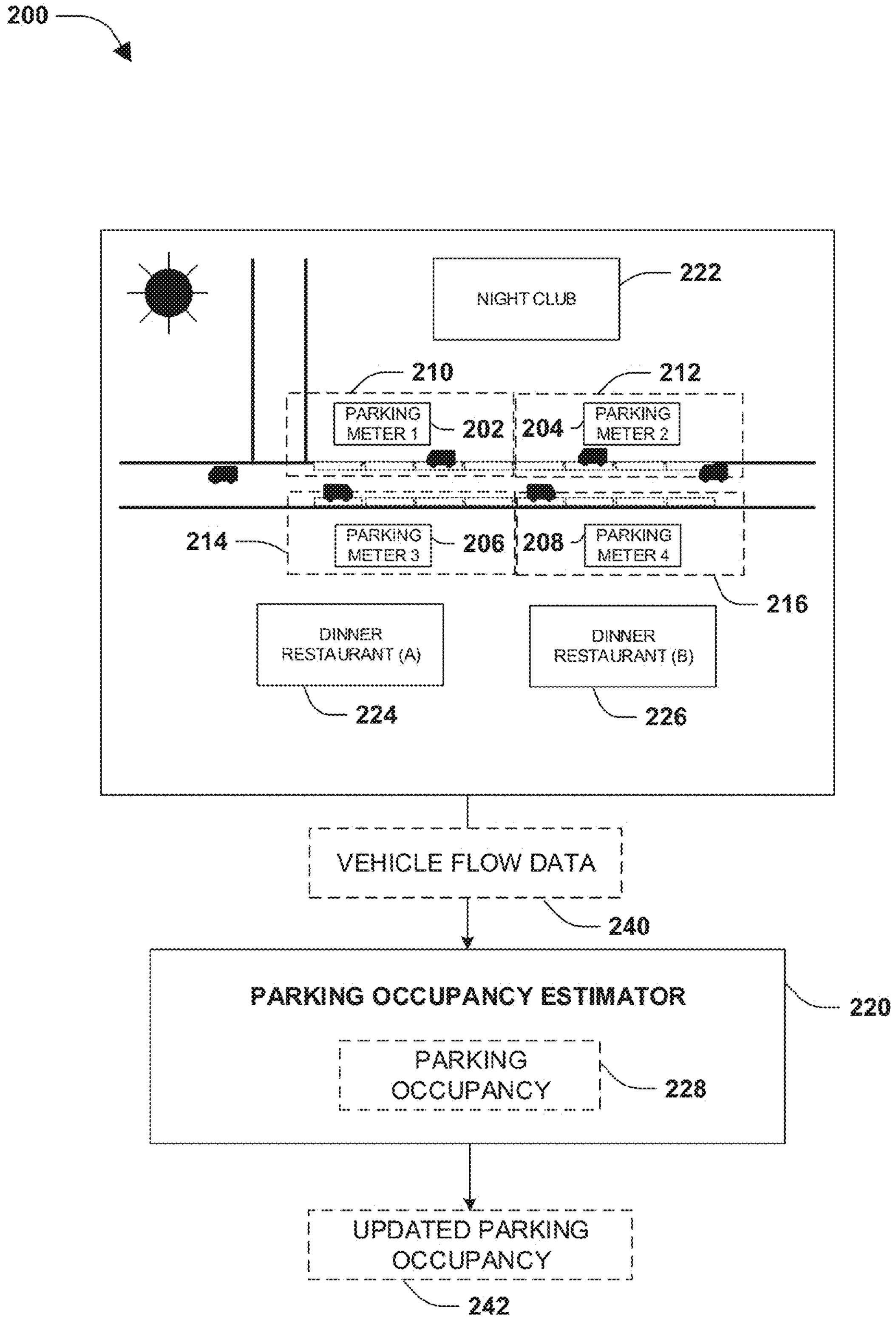
FIG. 2B is a component block diagram illustrating an exemplary system for estimating parking occupancy, where a parking occupancy is updated using vehicle flow data.

FIGS. 2A-2B illustrate examples of a system 200, comprising a parking occupancy estimator 220, configured for estimating parking occupancy. FIG. 2A illustrates the parking occupancy estimator 220 defining one or more zones encompassing parking meters near a night club 222, a dinner restaurant (A) 224, and a dinner restaurant (B) 226. For example, the parking occupancy estimator 220 may define a first zone 210 encompassing a first parking meter 202 and one or more parking spaces. The parking occupancy estimator 220 may define a second zone 212 encompassing a second parking meter 204 and one or more parking spaces. The parking occupancy estimator 220 may define a third zone 214 encompassing a third parking meter 206 and one or more parking spaces. The parking occupancy estimator 220 may define a fourth zone 216 encompassing a fourth parking meter 208 and one or more parking spaces. In an example, the one or more zones may be defined as non-overlapping zones. In another example, the one or more zones may be defined to overlap one another, parking meters, and/or parking spaces.

The parking occupancy estimator 220 may acquire parking meter transaction data 218 for the one or more parking meters. For example, the parking meter transaction data 218 may comprise data generated during a paid parking period (e.g., during the day, such as from 8:00 am to 6:00 am). The parking occupancy estimator 220 may evaluate the parking meter transaction data 218 to determine status data for the parking spaces encompassed by the one or more zones. The status data may indicate a probability that a parking space is available or occupied based upon the parking meter transaction data 218 indicating when a parking meter was paid and for how long. Similarly, the status data may indicate an estimated availability time at which an occupied parking space is estimated to become available. The parking occupancy estimator 220 may take into account the types of businesses that are within a threshold distance of the one or more zones when determining the status data (e.g., parking spaces may be less likely to be occupied because the night club 222 and dinner restaurants are less likely to have patrons during the day). The parking occupancy estimator 220 may estimate a parking occupancy 228 for the one or more zones based upon the status data. The parking occupancy 228 may indicate how likely parking spaces are available within a zone. The parking occupancy estimator 220 may estimate a block parking occupancy for a block of parking spaces based upon parking occupancies estimated for the first zone 210 and the second zone 212 and/or for a second block of parking spaces based upon parking occupancies estimated for the third zone 214 and the fourth zone 216.

FIG. 2B illustrates the parking occupancy estimator 220 acquiring vehicle flow data 240 associated with one or more vehicles that may be traveling near the one or more zones. The parking occupancy estimator 220 may evaluate the vehicle flow data 240 to determine start trip counts of vehicles that started trips from the respective zones and/or end trip counts of vehicles that ended trips at the respective zones. The parking occupancy estimator 220 may determine net numbers of vehicles within the respective zones at a point of time based upon differences between the end trip counts and the start trip counts for the respective zones. The parking occupancy estimator 220 may integrate the net numbers of vehicles over time to determine net numbers of vehicles observed to be remaining in the respective zones compared to leaving the respective zones. The parking occupancy estimator 220 may update the parking occupancy 228 for the respective zones based upon the net numbers of vehicles observed to be remaining in the respective zones compared to leaving the respective zones to create updated parking occupancies 242 for the respective zones.

Figure 3:
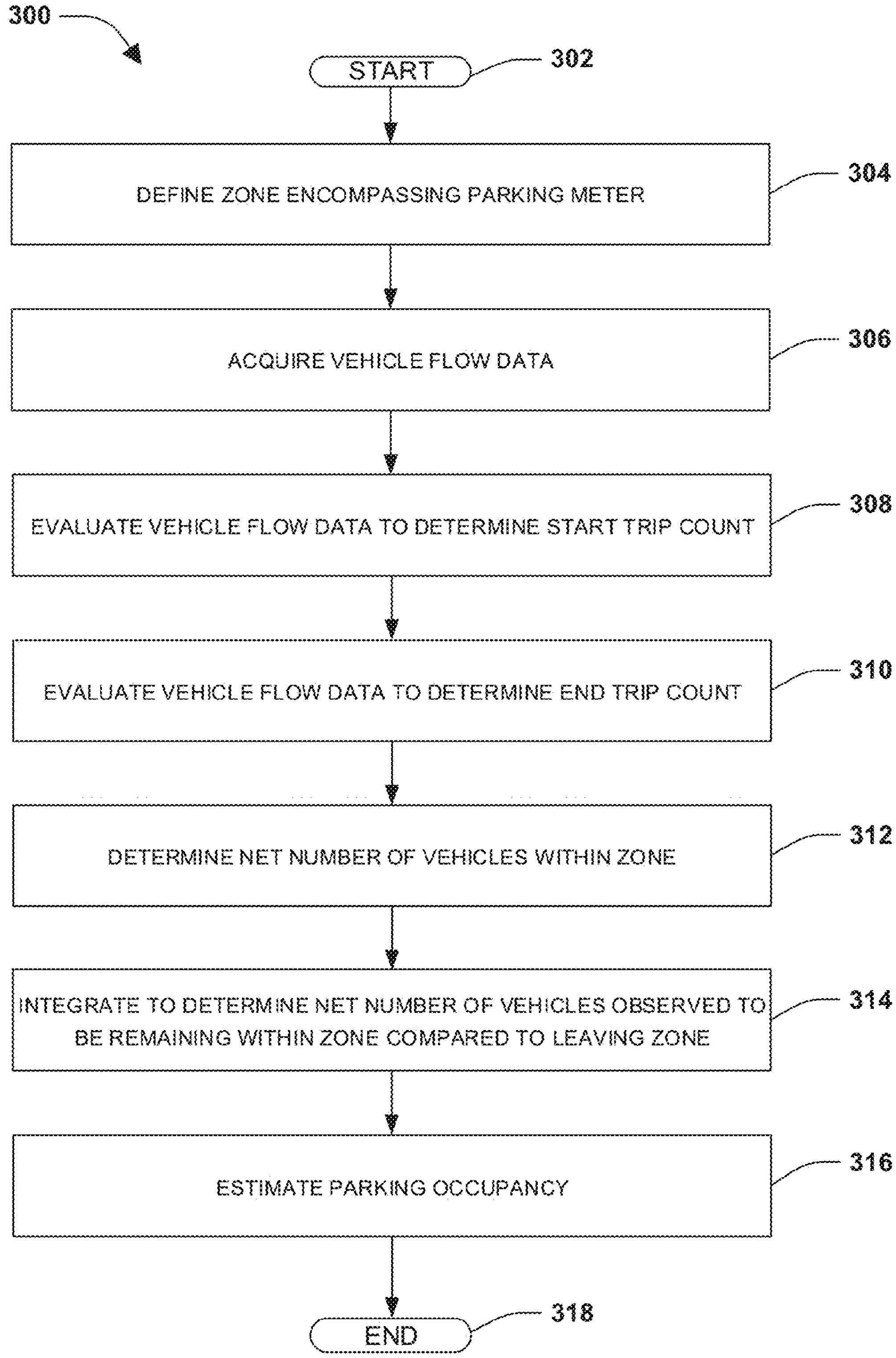
FIG. 3 is a flow diagram illustrating an exemplary method of estimating parking occupancy using vehicle flow data.

An embodiment of estimating parking occupancy is illustrated by an exemplary method 300 of FIG. 3. At 302, the method 300 starts. At 304, a zone encompassing a parking meter may be defined. The zone may encompass one or more parking spaces managed by the parking meter. At 306, vehicle flow data, associated with one or more vehicles, may be acquired. In an example the vehicle flow data may be obtained during a free-period where parking at the one or more parking spaces may be free (e.g., parking meter transaction data may be unavailable between 6:00 pm and 8:00 am because drivers may be allowed to park for free within the one or more parking spaces, and thus the vehicle flow data may be used to determine parking occupancy). At 308, the vehicle flow data may be evaluated to determine a start trip count of vehicles that started trips from the zone. At 310, the vehicle flow data may be evaluated to determine an end trip count of vehicles that ended trips in the zone. At 312, a net number of vehicles within the zone at a point of time may be determined based upon a difference between the end trip count and the start trip count. At 314, the net number of vehicles may be integrated over time to determine a net number of vehicles observed to be remaining in the zone compared to leaving the zone. At 316, a parking occupancy for the zone may be determined based upon the net number of vehicles observed to be remaining in the zone compared to leaving the zone. In an example, the parking occupancy may be updated based upon parking meter transaction data for the parking meter. At 318, the method 300 ends.

Figure 4A:
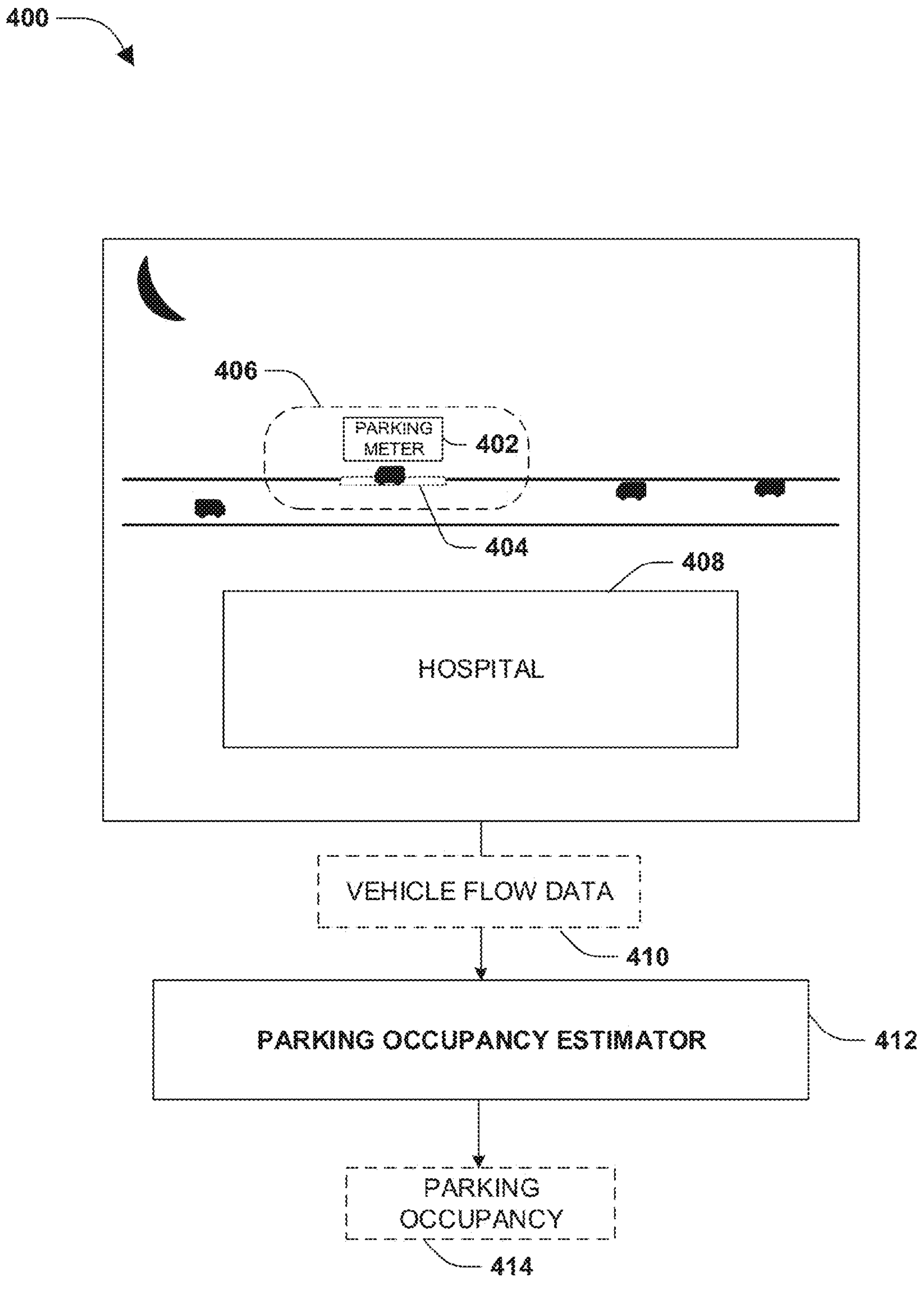
FIG. 4A is a component block diagram illustrating an exemplary system for estimating parking occupancy using vehicle flow data.
Figure 4B:
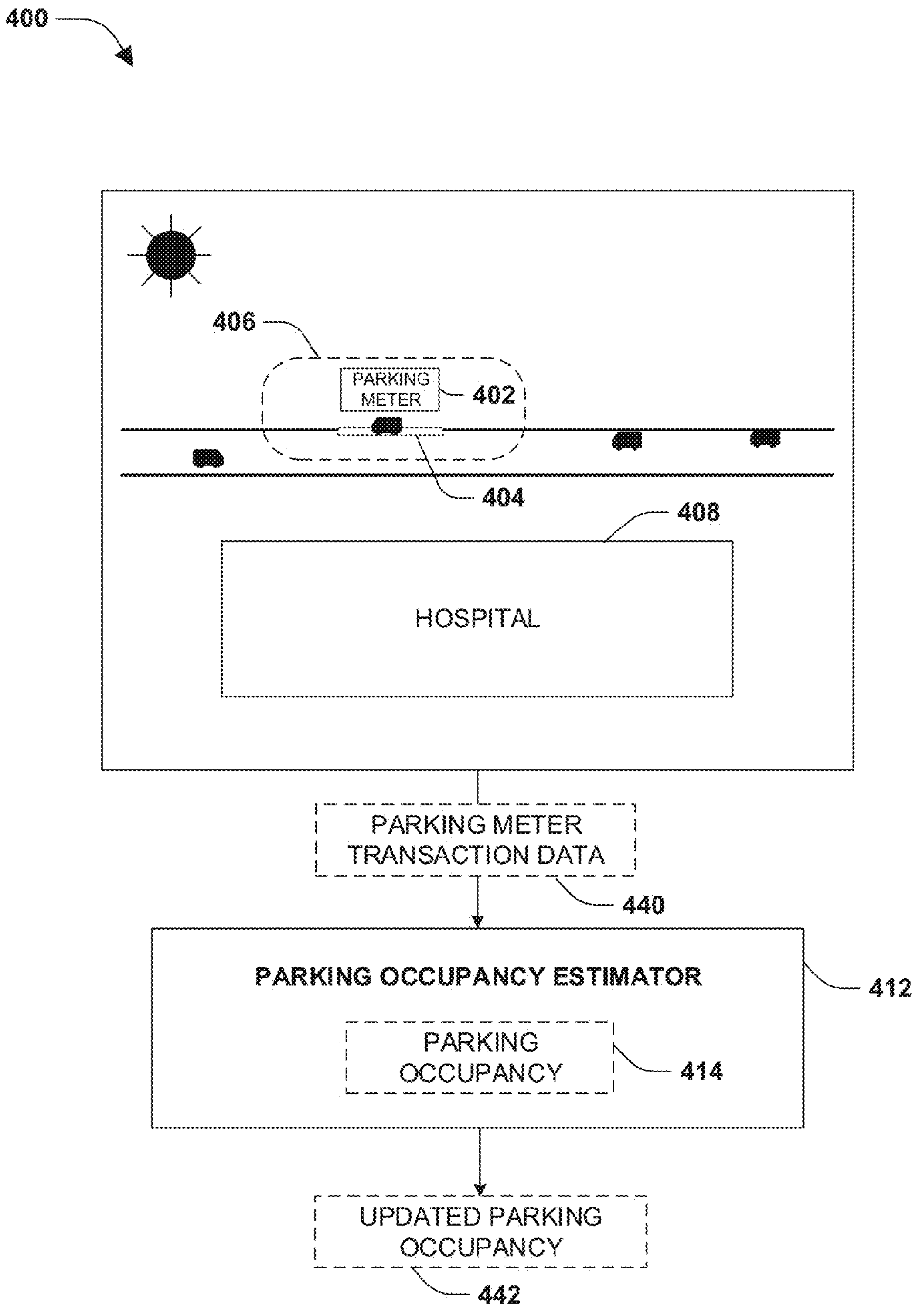
FIG. 4B is a component block diagram illustrating an exemplary system for estimating parking occupancy, where a parking occupancy is updated using parking meter transaction data.

FIGS. 4A-4B illustrate examples of a system 400, comprising a parking occupancy estimator 412, configured for estimating parking occupancy. FIG. 4A illustrates the parking occupancy estimator 412 defining a zone 406 encompassing a parking meter 402 that manage a parking space 404 and/or other parking spaces near a hospital 408. The zone 406 may be defined as any shape or size. The parking occupancy estimator 412 may acquire vehicle flow data 410 associated with one or more vehicles, such as from vehicles traveling within a proximity to the zone 406. The vehicle flow data may comprise a location of a vehicle, a speed of the vehicle, a heading of the vehicle, and/or other data that may be derived from global positioning system (GPS) data provided by the vehicle.

The parking occupancy estimator 412 may evaluate the vehicle flow data to determine a start trip count of vehicles that started trips from the zone 406 (e.g., vehicles that left the parking space 404) and an end trip count of vehicles that ended trips in the zone 406 (e.g., vehicles that parked at the parking space 404). The parking occupancy estimator 412 may determine a net number of vehicles within the zone 406 at a point in time based upon a difference between the end trip count and the start trip count. The parking occupancy estimator 412 may integrate the net number of vehicles over time to determine a net number of vehicles observed to be remaining in the zone 406 compared to leaving the zone 406. The parking occupancy estimator 412 may estimate a parking occupancy 414 for the zone 406 (e.g., a likelihood that the parking space 404 and/or other parking spaces within the zone 406 are available) based upon the net number of vehicles observed to be remaining in the zone 406 compared to leaving the zone 406. The parking occupancy estimator 412 may take into account the types of businesses that are within a threshold distance of the zone 406 when determining the parking occupancy 414 (e.g., irregular or sporadic parking may occur near the hospital 408).

FIG. 4B illustrates the parking occupancy estimator 412 acquiring parking meter transaction data 440 from the parking meter 402. The parking meter transaction data 440 may comprise a parking meter identifier of the parking meter 402, a timestamp associated with when the parking meter 402 was paid, and a paid parking duration for which parking, such as at the parking space 404, was paid. The parking occupancy estimator 412 may evaluate the parking meter transaction data 440 to determine status data for the parking space 404 and/or other parking spaces within the zone 406. The status data may indicate whether the parking space 404 is available or occupied. If the parking space 404 is occupied, then the status data may comprise an estimated availability time at which the parking space 404 may become available. The parking occupancy estimator 412 may update the parking occupancy 414 based upon the status data to create updated parking occupancy 442 for the zone 406.

Figure 5:
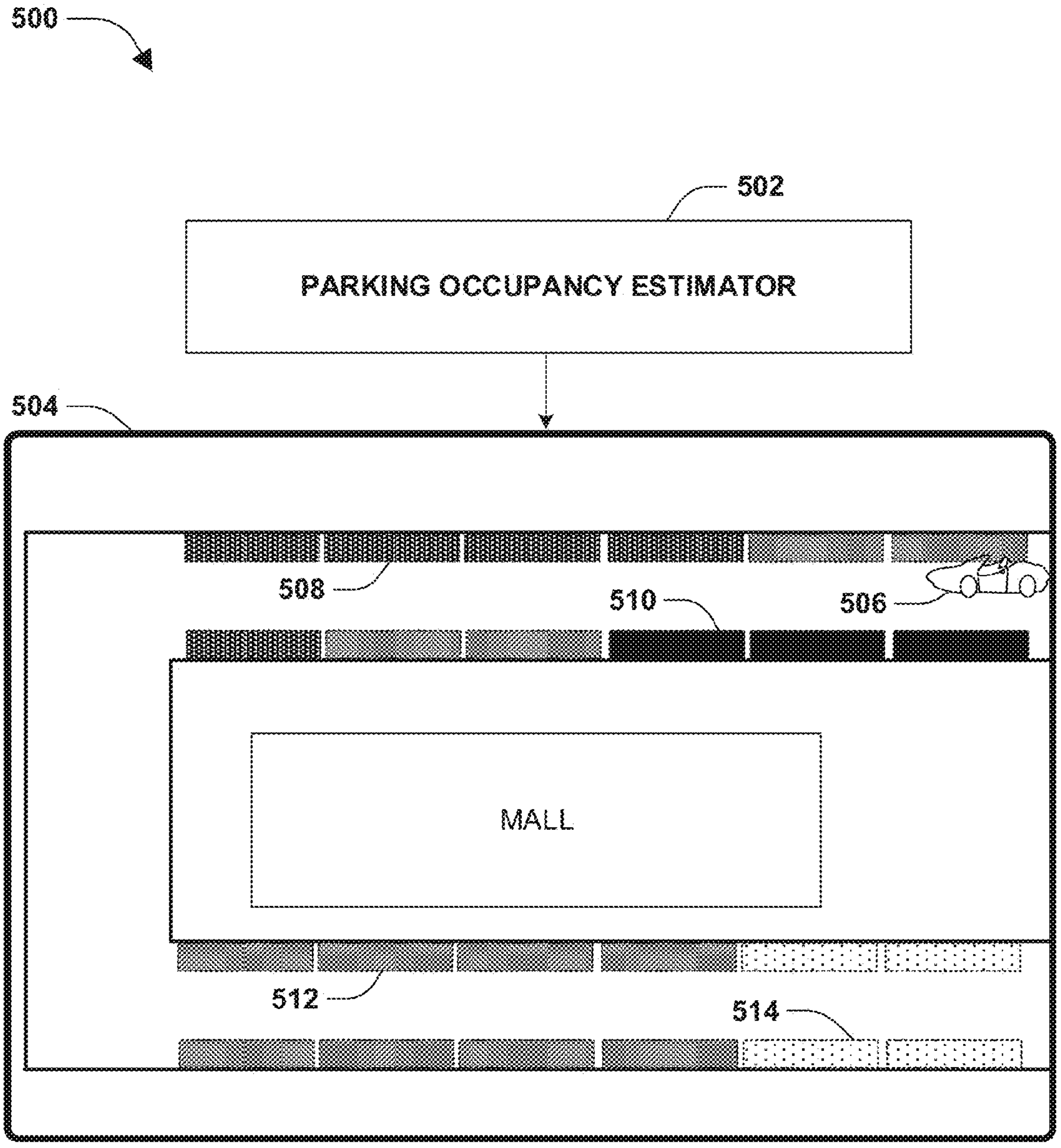

FIG. 5 illustrates an example of a system 500, comprising a parking occupancy estimator 502, for displaying a parking occupancy through a user interface 504 associated with a device (e.g., a wearable device, a smart phone, a vehicle head-end, a mobile app, a website, a windshield projection, etc.). The parking occupancy estimator 502 may have determined parking occupancies for parking spaces near a mall based upon parking meter transaction data and/or vehicle flow data.

The parking occupancy estimator 502 may display parking space user interface elements corresponding to the parking spaces near the mall. If a parking occupancy for a parking space corresponds to a low occupancy threshold range (e.g., a high likelihood that the parking space will be available for a driver of a vehicle 506), then a low occupancy status may be displayed for the parking space, such as the light dotted fill of a first parking space 514. If a parking occupancy for a parking space corresponds to a medium occupancy threshold range (e.g., a moderate likelihood that the parking space will be available for the driver of the vehicle 506), then a medium occupancy status may be displayed for the parking space, such as the medium dotted fill of a second parking space 512. If a parking occupancy for a parking space corresponds to a high occupancy threshold range (e.g., a low likelihood that the parking space will be available for the driver of the vehicle 506), then a high occupancy status may be displayed for the parking space, such as the dense dotted fill of a third parking space 508. If a parking occupancy for a parking space is indicative of a parking obstruction (e.g., a threshold amount of time where no vehicles are parking within a parking space but other nearby parking spaces have high occupancy), then an obstruction status may be displayed for the parking space, such as the black fill of a fourth parking space 510.

Figure 6:
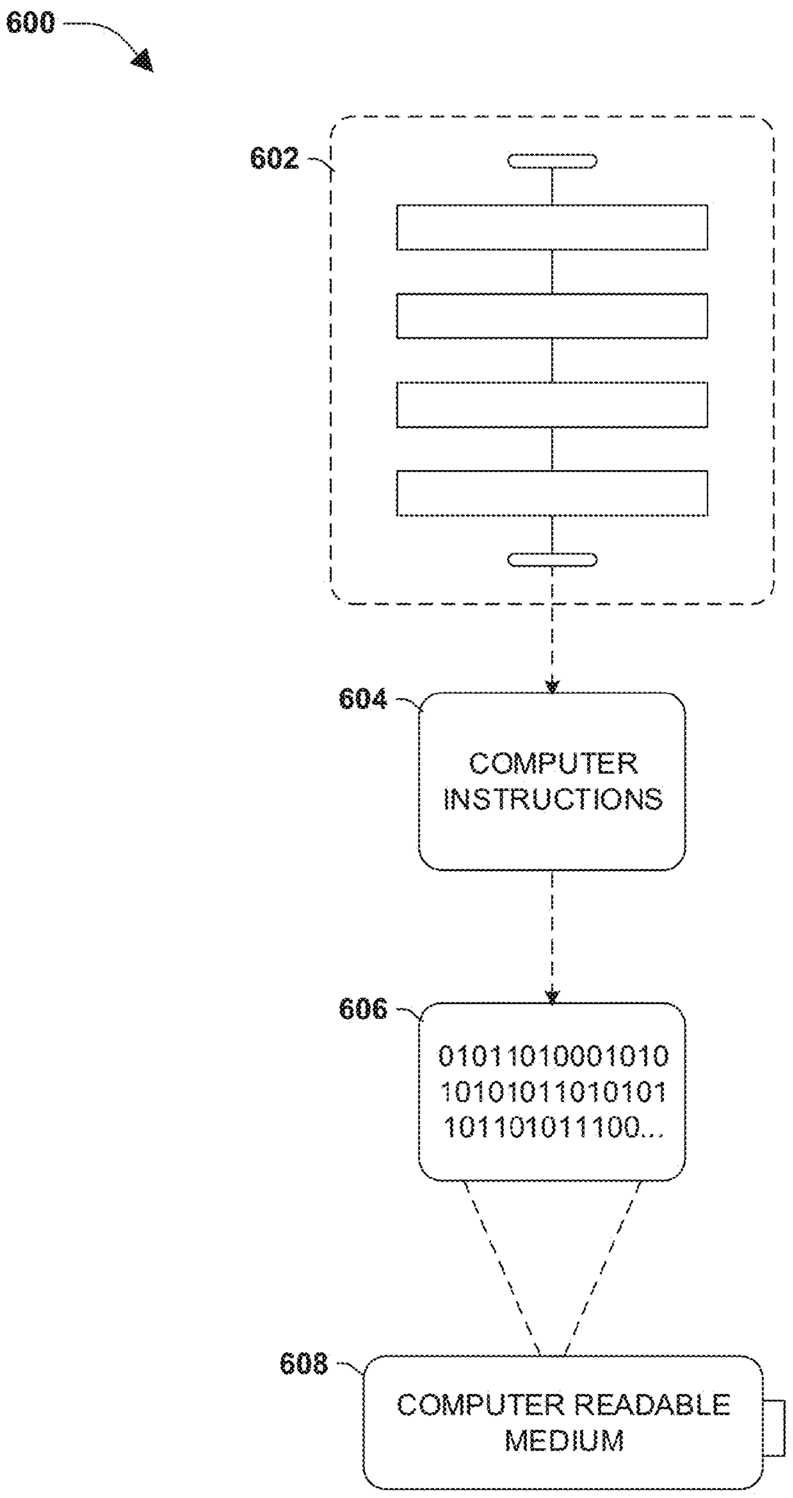
FIG. 6 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device is illustrated in FIG. 6, wherein the implementation 600 comprises a computer-readable medium 608, such as a CD-R, DVD-R, flash drive, a platter of a hard disk drive, etc., on which is encoded computer-readable data 606. This computer-readable data 606, such as binary data comprising at least one of a zero or a one, in turn comprises a set of computer instructions 604 configured to operate according to one or more of the principles set forth herein. In some embodiments, the set of computer instructions 604 are configured to perform a method 602, such as at least some of the exemplary method 100 of FIG. 1 and/or at least some of the exemplary method 300 of FIG. 3, for example. In some embodiments, the set of computer instructions 604 are configured to implement a system, such as at least some of the exemplary system 200 of FIGS. 2A-2B, at least some of the exemplary system 400 of FIGS. 4A-4B, and/or at least some of the exemplary system 500 of FIG. 5, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 7:
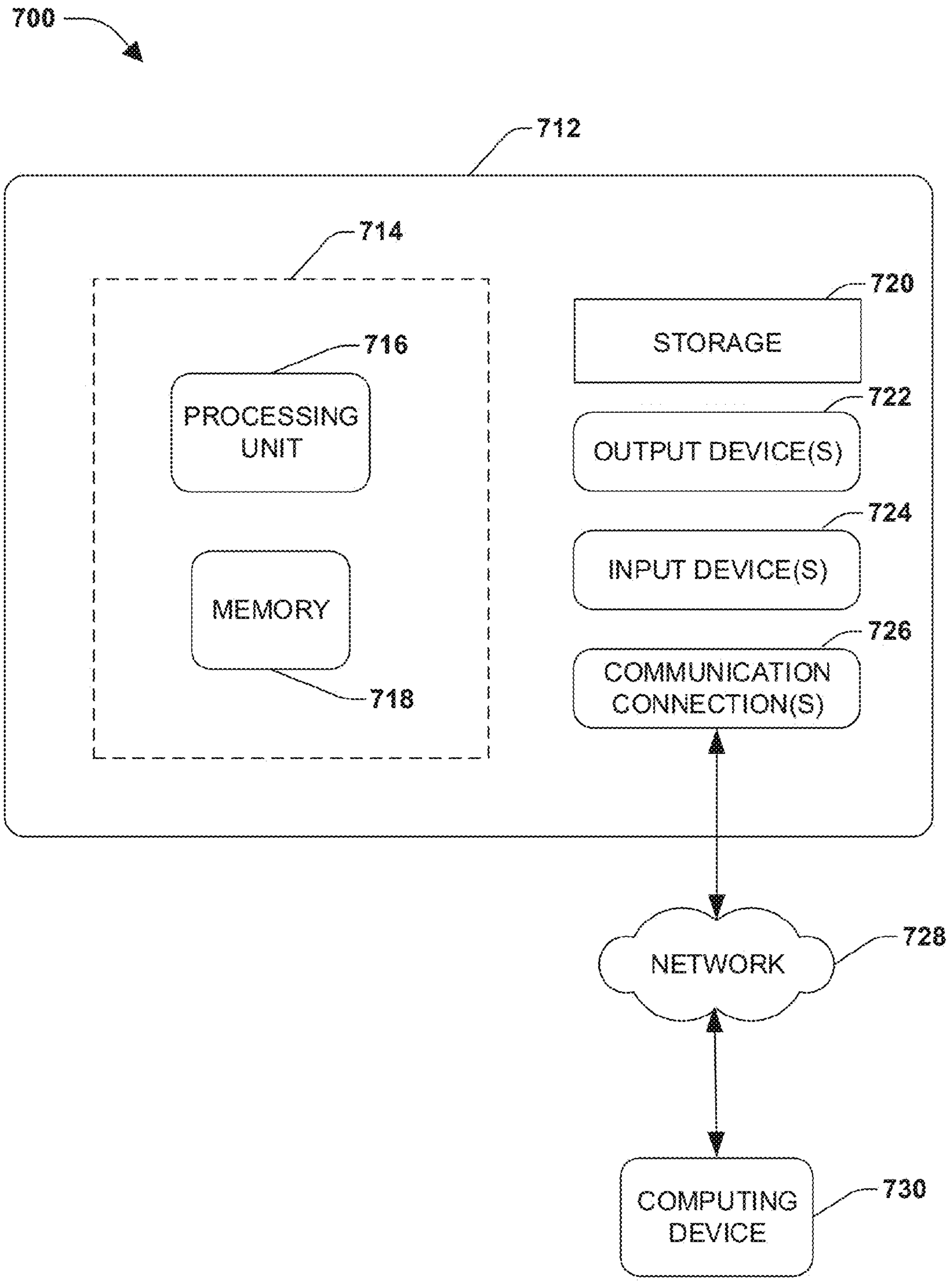
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 700 comprising a computing device 712 configured to implement one or more embodiments provided herein. In one configuration, computing device 712 includes at least one processing unit 716 and memory 718. Depending on the exact configuration and type of computing device, memory 718 may be volatile (such as RAM, for example), non-volatile (such as ROM, flash memory, etc., for example) or some combination of the two. This configuration is illustrated in FIG. 7 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 7 by storage 720. In one embodiment, computer readable instructions to implement one or more embodiments provided herein may be in storage 720. Storage 720 may also store other computer readable instructions to implement an operating system, an application program, and the like. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Computer storage media does not, however, include propagated signals. Rather, computer storage media excludes propagated signals. Any such computer storage media may be part of device 712.

Device 712 may also include communication connection(s) 726 that allows device 712 to communicate with other devices. Communication connection(s) 726 may include, but is not limited to, a modem, a Network Interface Card (NIC), an integrated network interface, a radio frequency transmitter/receiver, an infrared port, a USB connection, or other interfaces for connecting computing device 712 to other computing devices.

Communication connection(s) 726 may include a wired connection or a wireless connection. Communication connection(s) 726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device(s) 724 such as keyboard, mouse, pen, voice input device, touch input device, infrared cameras, video input devices, and/or any other input device. Output device(s) 722 such as one or more displays, speakers, printers, and/or any other output device may also be included in device 712. Input device(s) 724 and output device(s) 722 may be connected to device 712 via a wired connection, wireless connection, or any combination thereof. In one embodiment, an input device or an output device from another computing device may be used as input device(s) 724 or output device(s) 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 712 may be interconnected by a network. For example, memory 718 may be comprised of multiple physical memory units located in different physical locations interconnected by a network.

Those skilled in the art will realize that storage devices utilized to store computer readable instructions may be distributed across a network. For example, a computing device 730 accessible via a network 728 may store computer readable instructions to implement one or more embodiments provided herein. Computing device 712 may access computing device 730 and download a part or all of the computer readable instructions for execution. Alternatively, computing device 712 may download pieces of the computer readable instructions, as needed, or some instructions may be executed at computing device 712 and some at computing device 730.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for estimating parking availability, comprising:
- defining a zone encompassing a parking meter;
- acquiring cellular data associated with the parking meter;
- evaluating the cellular data to determine status data for one or more parking spaces, the status data comprising an estimation as to whether the one or more parking spaces are available or occupied, the status data comprising an estimated availability time at which one or more occupied parking spaces are estimated to become available;
- estimating a parking availability for the zone based upon the status data; and
- displaying the parking availability through a user interface, the displaying comprising:
  - responsive to the parking availability corresponding to a high availability threshold range, displaying a high availability status for a user interface element representing the zone through the user interface;
  - responsive to the parking availability corresponding a medium availability threshold range, displaying a medium availability status for the user interface element;
  - responsive to the parking availability corresponding a low availability threshold range, displaying a low availability status for the user interface element; and
  - responsive to the parking availability being indicative of a parking obstruction, displaying an obstruction status for the user interface element.

2. The method of claim 1, the cellular data comprising vehicle flow data associated with one or more vehicles, the method comprising:
- evaluating the vehicle flow data to determine a start trip count of vehicles that started trips from the zone;
- evaluating the vehicle flow data to determine an end trip count of vehicles that ended trips in the zone;
- determining a net number of vehicles within the zone at a point of time based upon a difference between the end trip count and the start trip count;
- integrating the net number of vehicles over time to determine a net number of vehicles observed to be remaining in the zone compared to leaving the zone; and
- updating the parking availability for the zone based upon the net number of vehicles observed to be remaining in the zone compared to leaving the zone to create an updated parking availability for the zone.

3. The method of claim 2, comprising:
- matching parking meter transaction data for the parking meter to the net number of vehicles observed to be remaining in the zone compared to leaving the zone to obtain a scale factor and offset; and
- applying the scale factor and offset to the net number of vehicles observed to be remaining in the zone compared to leaving the zone.

4. The method of claim 2, the updating the parking availability for the zone comprising:
- normalizing the net number of vehicles observed to be remaining in the zone compared to leaving the zone based upon parking meter transaction data for the parking meter.

5. The method of claim 2, the vehicle flow data comprising a location of a vehicle, a speed of the vehicle, and a heading of the vehicle.

6. The method of claim 1, comprising:
- estimating a set of parking availabilities for one or more zones encompassing portions of a block of parking spaces;
- determining a block parking availability for the block of parking spaces based upon the set of parking availabilities; and
- displaying the block parking availability through the user interface.

7. The method of claim 6, the displaying the block parking availability comprising:
- responsive to the block parking availability corresponding to the high availability threshold range, displaying the high availability status for a block user interface element representing the block through the user interface;
- responsive to the block parking availability corresponding the medium availability threshold range, displaying the medium availability status for the block user interface element;
- responsive to the block parking availability corresponding the low availability threshold range, displaying the low availability status for the block user interface element; and
- responsive to the block parking availability being indicative of the parking obstruction, displaying the obstruction status for the block user interface element.

8. The method of claim 6, the displaying the block parking availability comprising:
- responsive to the block parking availability being indicative of a restriction, displaying a restriction status for a block user interface element representing the block through the user interface.

9. The method of claim 1, comprising:
evaluating parking meter transaction data for the parking meter to determine a payment rate for the parking meter; and
displaying the payment rate through the user interface.

10. The method of claim 1, comprising:
identifying a business within a threshold distance of the zone; and
adjusting the parking availability based upon a business type of the business.

11. The method of claim 1, comprising:
generating a parking availability model based upon the parking availability; and
predicting a future parking availability for the zone based upon the parking availability model.

12. The method of claim 11, the generating a parking availability model comprising:
training the parking availability model based upon parking availabilities associated with at least one of a weather condition, a season, or an event occurrence.

13. The method of claim 1, the displaying the parking availability comprising:
displaying a textual indication of the parking availability through the user interface.

14. The method of claim 1, the cellular data comprising global positioning system (GPS) data.

15. The method of claim 1, comprising:
determining a total paid parking duration for a first time period; and
estimating a first parking availability for the first time period based upon the total paid parking duration.

16. The method of claim 1, comprising:
acquiring parking meter transaction data for the parking meter, the parking meter transaction data comprising a parking meter identifier, a timestamp associated with when the parking meter was paid, and a paid parking duration for which parking was paid, the evaluating based upon the parking meter transaction data.

17. A system for estimating parking availability, comprising:
a parking availability estimator configured to:
define a zone encompassing a parking meter;
acquire cellular data associated with one or more vehicles;
evaluate the cellular data to determine a start trip count of vehicles that started trips from the zone;
evaluate the cellular data to determine an end trip count of vehicles that ended trips in the zone;
determine a net number of vehicles within the zone at a point of time based upon a difference between the end trip count and the start trip count;
integrate the net number of vehicles over time to determine a net number of vehicles observed to be remaining in the zone compared to leaving the zone;
match parking meter transaction data to the net number of vehicles observed to be remaining in the zone compared to leaving the zone to obtain a scale factor and offset;
apply the scale factor and offset to the net number of vehicles observed to be remaining in the zone compared to leaving the zone;
estimate a parking availability for the zone based upon the net number of vehicles observed to be remaining in the zone compared to leaving the zone; and
display the parking availability through a user interface.

18. The system of claim 17, the parking availability estimator configured to:
acquire the parking meter transaction data for the parking meter;
evaluate the parking meter transaction data to determine status data for one or more parking spaces, the status data comprising an estimation as to whether the one or more parking spaces are available or occupied, the status data comprising an estimated availability time at which one or more occupied parking spaces are estimated to become available; and
update the parking availability for the zone based upon the status data.

19. A non-transitory computer readable medium comprising instructions which when executed perform a method for estimating parking availability, comprising:
defining a zone encompassing a parking meter;
acquiring cellular data associated with one or more vehicles;
evaluating the cellular data to determine a start trip count of vehicles that started trips from the zone;
evaluating the cellular data to determine an end trip count of vehicles that ended trips in the zone;
determining a net number of vehicles within the zone at a point of time based upon a difference between the end trip count and the start trip count;
integrating the net number of vehicles over time to determine a net number of vehicles observed to be remaining in the zone compared to leaving the zone;
estimating a parking availability for the zone based upon the net number of vehicles observed to be remaining in the zone compared to leaving the zone; and
adjusting the parking availability based upon a business type of a business within a threshold distance of the zone.

20. A method for estimating parking availability, comprising:
defining a zone encompassing a parking meter;
acquiring cellular data associated with one or more vehicles;
evaluating the cellular data to determine a start trip count of vehicles that started trips from the zone;
evaluating the cellular data to determine an end trip count of vehicles that ended trips in the zone;
determining a net number of vehicles within the zone at a point of time based upon a difference between the end trip count and the start trip count;
integrating the net number of vehicles over time to determine a net number of vehicles observed to be remaining in the zone compared to leaving the zone;
matching parking meter transaction data to the net number of vehicles observed to be remaining in the zone compared to leaving the zone to obtain a scale factor and offset;
applying the scale factor and offset to the net number of vehicles observed to be remaining in the zone compared to leaving the zone;
estimating a parking availability for the zone based upon the net number of vehicles observed to be remaining in the zone compared to leaving the zone; and
displaying the parking availability through a user interface.

* * * * *